US007053915B1

(12) United States Patent
Jung et al.

(10) Patent No.: US 7,053,915 B1

(45) Date of Patent: May 30, 2006

(54) METHOD AND SYSTEM FOR ENHANCING VIRTUAL STAGE EXPERIENCE

(75) Inventors: Namsoon Jung, State College, PA (US); Rajeev Sharma, State College, PA (US)

(73) Assignee: Advanced Interfaces, Inc, State College, PA (US)

(*) Notice: Subject to any disclaimer, the term of this patent is extended or adjusted under 35 U.S.C. 154(b) by 379 days.

(21) Appl. No.: 10/621,181

(22) Filed: Jul. 16, 2003

Related U.S. Application Data

(60) Provisional application No. 60/399,542, filed on Jul. 30, 2002.

(51) Int. Cl.
*G09G 5/00* (2006.01)
*G09B 5/00* (2006.01)

(52) U.S. Cl. .................. 345/633; 345/629; 434/307 A

(58) Field of Classification Search ........ 345/629–641, 345/473, 474; 434/307 A, 308, 309, 314; 382/284
See application file for complete search history.

(56) References Cited

U.S. PATENT DOCUMENTS

| | | | | |
|---|---|---|---|---|
| 5,782,692 | A * | 7/1998 | Stelovsky | 434/307 A |
| 5,790,124 | A | 8/1998 | Fischer et al. | |
| 6,086,380 | A | 7/2000 | Chu et al. | |
| 6,231,347 | B1 | 5/2001 | Tsai | |
| 6,386,985 | B1 | 5/2002 | Rackham | |
| 6,400,374 | B1 * | 6/2002 | Lanier | 345/630 |
| 6,692,259 | B1 * | 2/2004 | Kumar et al. | 434/307 A |
| 2001/0034255 | A1 * | 10/2001 | Hayama et al. | 463/1 |
| 2002/0007718 | A1 * | 1/2002 | Corset | 84/609 |
| 2003/0167908 | A1 * | 9/2003 | Nishitani et al. | 84/723 |

FOREIGN PATENT DOCUMENTS

| | | |
|---|---|---|
| EP | 0782338 | 2/1997 |

OTHER PUBLICATIONS

U.S. Appl. No. 60/369,279, filed Apr. 2, 2002, Sharma et al.
U.S. Appl. No. 60/394,324, filed Jul. 8, 2002, Sharma et al.

(Continued)

*Primary Examiner*—Matthew Luu

(57) ABSTRACT

The present invention is a system and method for increasing the value of the audio-visual entertainment systems, such as karaoke, by simulating a virtual stage environment and enhancing the user's facial image in a continuous video input, automatically, dynamically and in real-time. The present invention is named Enhanced Virtual Karaoke (EVIKA). The EVIKA system consists of two major modules, the facial image enhancement module and the virtual stage simulation module. The facial image enhancement module augments the user's image using the embedded Facial Enhancement Technology (F.E.T.) in real-time. The virtual stage simulation module constructs a virtual stage in the display by augmenting the environmental image. The EVIKA puts the user's enhanced body image into the dynamic background, which changes according to the user's arbitrary motion. During the entire process, the user can interact with the system and select and interact with the virtual objects on the screen. The capability of real-time execution of the EVIKA system even with complex backgrounds enables the user to experience a whole new live virtual entertainment environment experience, which was not possible before.

23 Claims, 6 Drawing Sheets

OTHER PUBLICATIONS

Figure 1:
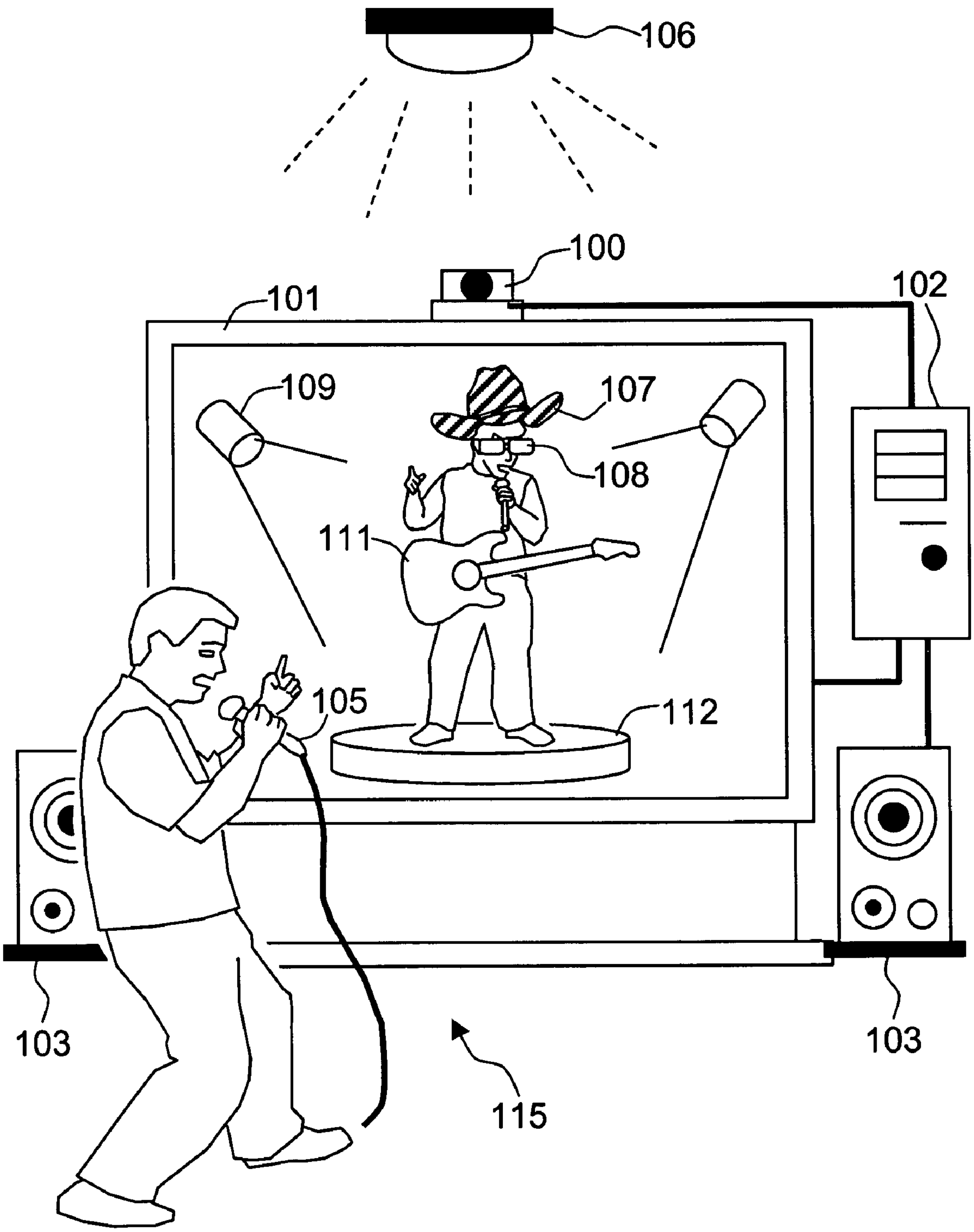

M.Harville, et al.,Proc. of IEEE Workshop on Detection and Recognition of Events in Video,Jul. 2001.

S. Lee, et al.,Proc. of International Conference on Virtual Systems and MultiMedia, 2001.

C.H. Lin, et al.,IEEE transactions on image processing, vol. 8, No. 6, pp. 834-845, Jun. 1999.

M. Lyons, et al., Proc. of ACM Multimedia 98, pp. 427-434, 1998.

C. Ridder, et al.,Proc. of ICRAM 95, UNESCO Chair on Mechatronics, 193-199, 1995.

C. Stauffer et al.,In Computer Vision and Pattern Recognition,vol. 2, pp. 246-253, Jun. 1999.

* cited by examiner

METHOD AND SYSTEM FOR ENHANCING VIRTUAL STAGE EXPERIENCE

CROSS-REFERENCE TO RELATED APPLICATIONS

This application is entitled to the benefit of Provisional Patent Application Ser. No. 60/399,542, filed Jul. 30, 2002.

BACKGROUND OF THE INVENTION—FIELD OF THE INVENTION

The present invention relates to a system and method for enhancing the audio-visual entertainment environment, such as karaoke, by simulating a virtual stage environment and enhancing facial images by superimposing virtual objects on top of the continuous 2D human face image automatically, dynamically and in real-time, using a facial feature enhancement technology (FET). This invention provides a dynamic and virtual background where the user's body image can be placed and changed according to the user's arbitrary movement.

BACKGROUND OF THE INVENTION

Karaoke, noraebang, (a kind of Korean sing-along entertainment system similar to karaoke), and other sing-along systems are a few examples of popular audio-visual entertainment systems. Although there are various types of karaoke systems, they traditionally consist of a microphone, music/sound system, video display system, controlling system, lighting, and several other peripherals. In a traditional karaoke system, a user selects the song he/she wants to sing by pressing buttons on the controlling device. The video display system usually has a looping video screen and the lyrics of the song at the bottom of the screen to help the user follow the music. Although the karaoke system is an interesting entertainment source, especially for its fascinating sound and music, this looping video screen is a boring part of the system to some people.

In order to make the video screen more interesting, there have been attempts to apply some image processing techniques, such as putting the singer's face image into a specific section of a background image. There have also been attempts to put the user's face image into printed materials.

European Patent Application EP0782338 of Sawa-gun, Gunma-ken et al. disclosed an approach to display a video image of a singer on the monitor of the system, in order to improve the quality of a "karaoke" system.

U.S. Pat. No. 6,400,374 of Lanier disclosed a system for superimposing a foreground image like a human head with face to the background image.

However, in the previous attempts, most approaches used a predefined static background or designated region, such as rectangular bounding box, in a video loop. In the case of using a predefined static background, the background cannot be interactively controlled by the user in real-time. Although the user moves, the background image is not able to respond to the user's arbitrary motion. On the other hand, in the case of using the rectangular bounding box, although it might be possible to make the bounding box move along with the user's head motion, the user does not seem to appear to be fully immersed into the background image. The superimposition of images is also limited by the granularity of face size rather than facial feature level. In these approaches, the human face image essentially becomes the superimposing object to the background templates or pre-handled video image sequences. However, we can also superimpose other virtual objects onto the human face image, thus further increasing the level of amusement. Human facial features can provide the useful local coordinate information within the face image in order to augment the human facial image.

Thus it is possible to greatly enhance the users' experience by using various computer vision and image processing technologies with the help of a video camera.

Advantage of the Invention

Unlike these previous attempts, our system, Enhanced Virtual Karaoke (EVIKA), uses a dynamic background, which can change in real-time according to the user's arbitrary motion. The user's image also appears to be fully immersed into the background, and the position of the user's image changes in any part of the background image as the user moves or dances while singing.

Another interesting feature of the dynamic background in the EVIKA system is that the user's image disappears behind the background if the user stands still. This adds an interesting and amusing value to the system, in which the user has to dance as long as the person wants to see himself on the screen. This feature can be utilized as a method to entice the user to participate in dancing. This also helps to encourage a group of users to participate.

In prior attempts at simulating the virtual reality environment, a blue background was frequently used. However, in the EVIKA system, any arbitrary background can be used, and no specific control of the actual environment is required. This means that the EVIKA system can be installed in any pre-existing commercial environment without destroying the pre-existing environment and re-installing a new expensive physical environment. The only condition might be that the environment should have enough lighting so that the image-capturing system and processing system in EVIKA can detect the face and facial features.

The background can also be aesthetically augmented for decoration by the virtual objects. Virtual musical instrument images, such as guitars, pianos, and drums, can be added to the background. The individual instrument images can be attached to the user's image, and the instrument images can move along with the user's movement. The user can also play the virtual instrument by watching the instrument on screen and moving his hands around the position of the virtual instrument. This allows the user to participate further in the experience and therefore increases enjoyment.

The EVIKA system uses the embedded FET system, which not only detects the face and facial features efficiently, but also superimposes virtual objects on top of the user's face and facial features in real-time. This facial enhancement is another valuable feature addition to the audio-visual entertainment system along with the fully immersed body image into the dynamic virtual background. The superimposed objects move along with the user's arbitrary motion in real-time. The user can change the virtual objects through a touch-free selection process. This process is achieved through tracking the user's hand motion in real-time. The virtual objects can be fanciful sunglasses, hat, hair wear, necklace, rings, beard, mustache, or anything else that can be attached to the human facial image. This whole process can transfigure the singer/dancer into a famous rock-star or celebrity on a stage and provides the user a new and exciting experience.

SUMMARY

The present invention processes a sequence of images received from an image-capturing device, such as a camera, and simulates a virtual environment through a display device. The implementation steps in the EVIKA system are as follows.

The EVIKA system is composed of two main modules, the facial image enhancement module and the virtual stage simulation module. The facial image enhancement module passes the captured continuous input video images to the embedded FET system in order to enhance the user's facial image, such as superimposing an image of a pair of sunglasses onto the image of the user's eyes. The FET system is a system for enhancing facial images in a continuous video by superimposing virtual objects onto the facial images automatically, dynamically and in real-time. The details of the FET system can be found in the following provisional patent application, R. Sharma and N. Jung, Method and System for Real-time Facial Image Enhancement, U.S. Provisional Patent. Application No. 60/394,324, Jul. 8, 2002. The superimposed objects move along with the user's arbitrary motion dynamically in real-time. The FET system detects and tracks the face and facial features, such as eyes, nose, and mouth, and finally it superimposes the face image with the selected virtual objects.

The virtual objects are selected by the user in real-time through the touch-free user interaction interface during the entire session. In a provisional patent application filed by R. Sharma, N. Krahnstoever, and E. Schapira, Method and System for Detecting Conscious Hand Movement Patterns and Computer-generated Visual Feedback for Facilitating Human-computer Interaction, U.S. Provisional Patent filed. Apr. 2, 2002, the authors describe a method and system for touch-free user interaction. After the FET system superimposes the virtual object, which is selected by the user in real-time on to the facial image, the facial image is enhanced and is ready to be combined with the simulated virtual background images. The enhanced facial image provides an interesting and entertaining view to the user and surrounding people.

The virtual stage simulation module is concerned about constructing the virtual stage. Customized virtual background images are created and prepared offline. The music clips are also stored in the digital music box. They are loaded at the beginning of the session and can be selected by the touch-free user interaction in real-time. A touch-free user interaction tool enables the user to select the music and the virtual background. When a new background and a new song are selected, they are combined to simulate the virtual stage. By adding the virtual objects images to the background the system produces an interesting and exciting environment. Through this virtual environment, the user is able to experience what was not possible before.

During or after the selection process, if the user moves, the background also changes dynamically. This dynamically changing background also contributes to the simulation of the virtual stage.

After the facial image enhancement module and the virtual stage simulation module finish the process, the images are combined. This creates the final virtual audio-visual entertainment system environment.

DRAWINGS—FIGURES

FIG. 1—Figure of the EVIKA System and User Interaction

Figure 2:
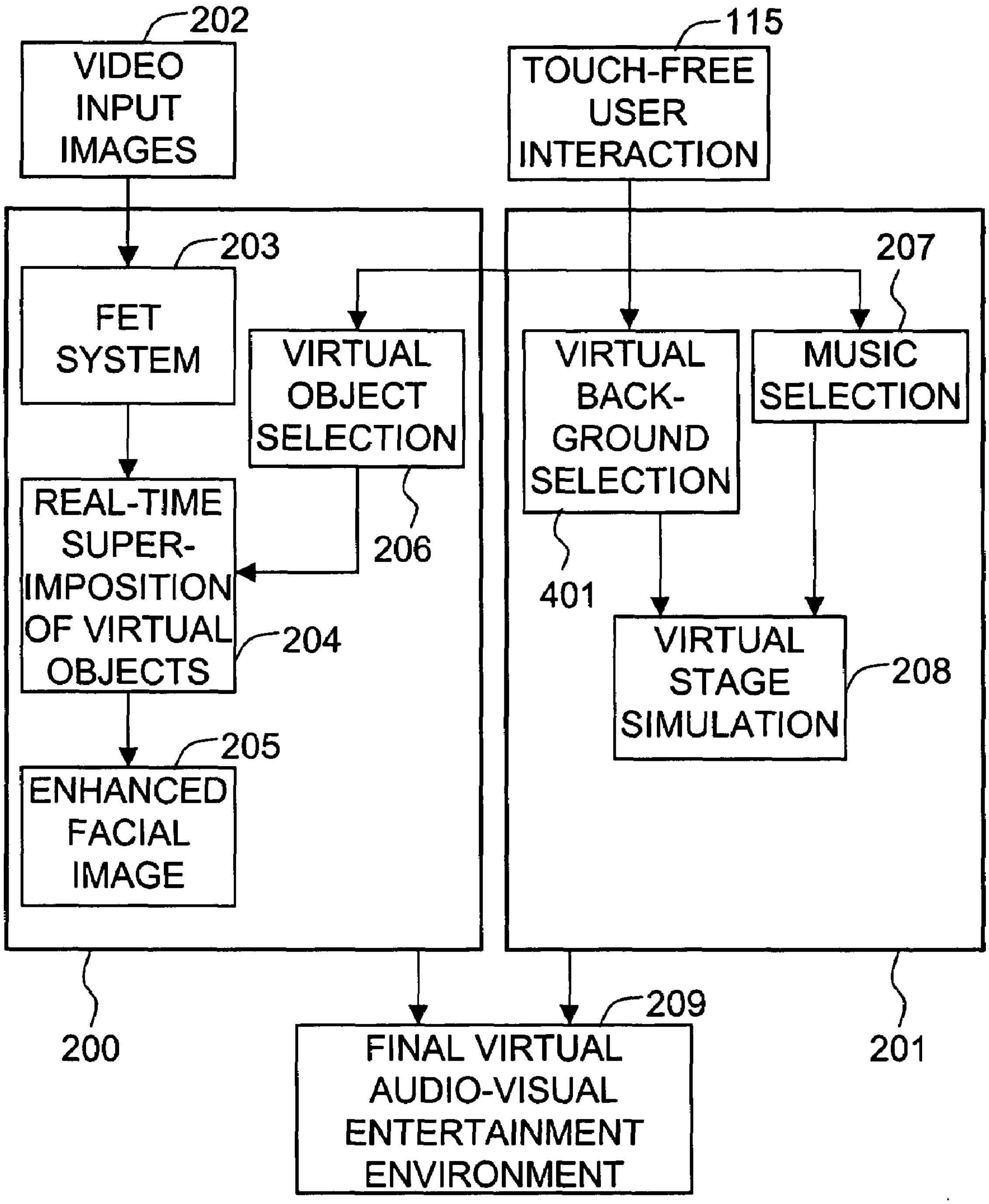

FIG. 2—Block Diagram for Overall View and Modules of the EVIKA system

Figure 3:
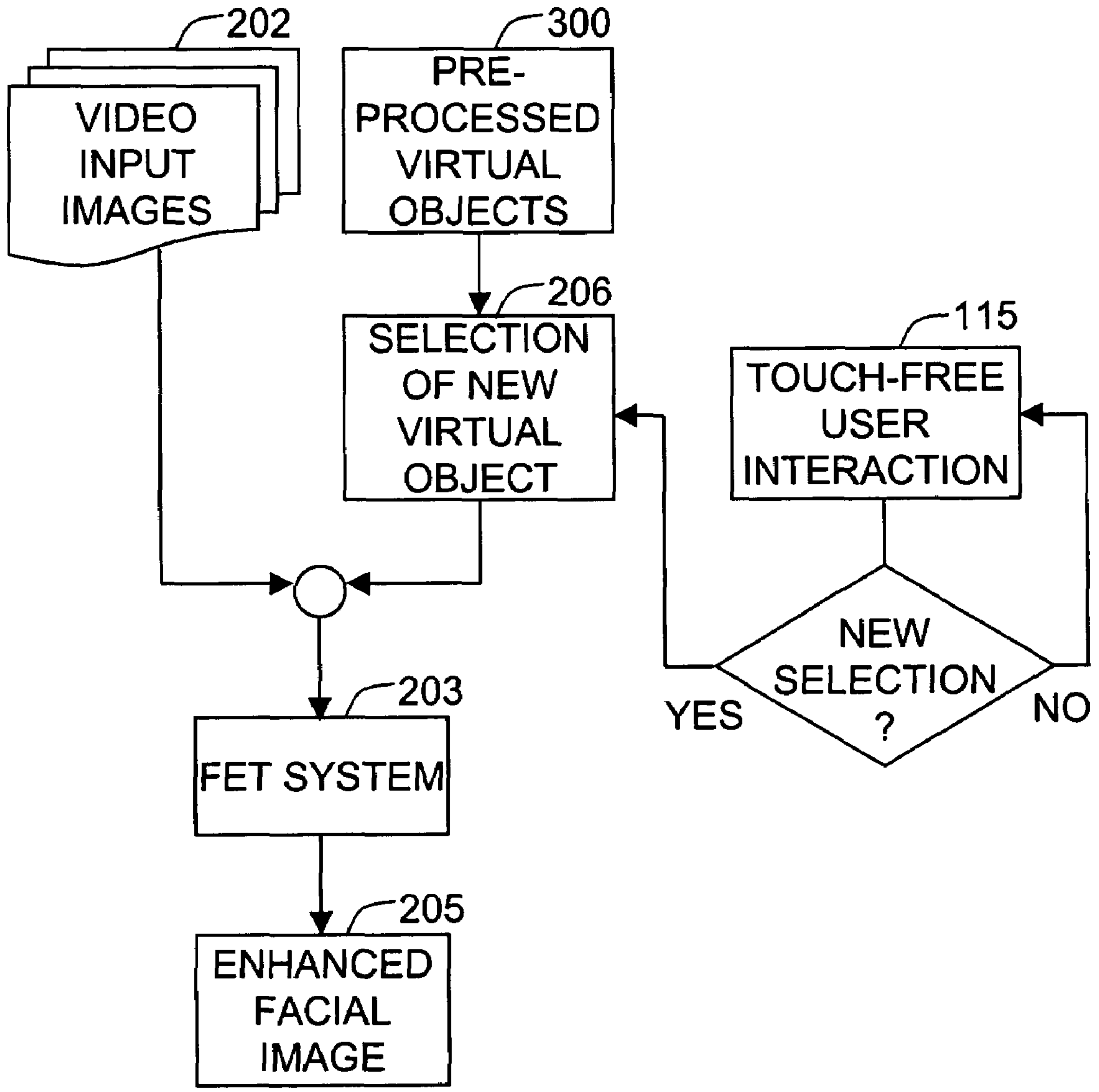

FIG. 3—Block Diagram for Facial Image Enhancement Module

Figure 4:
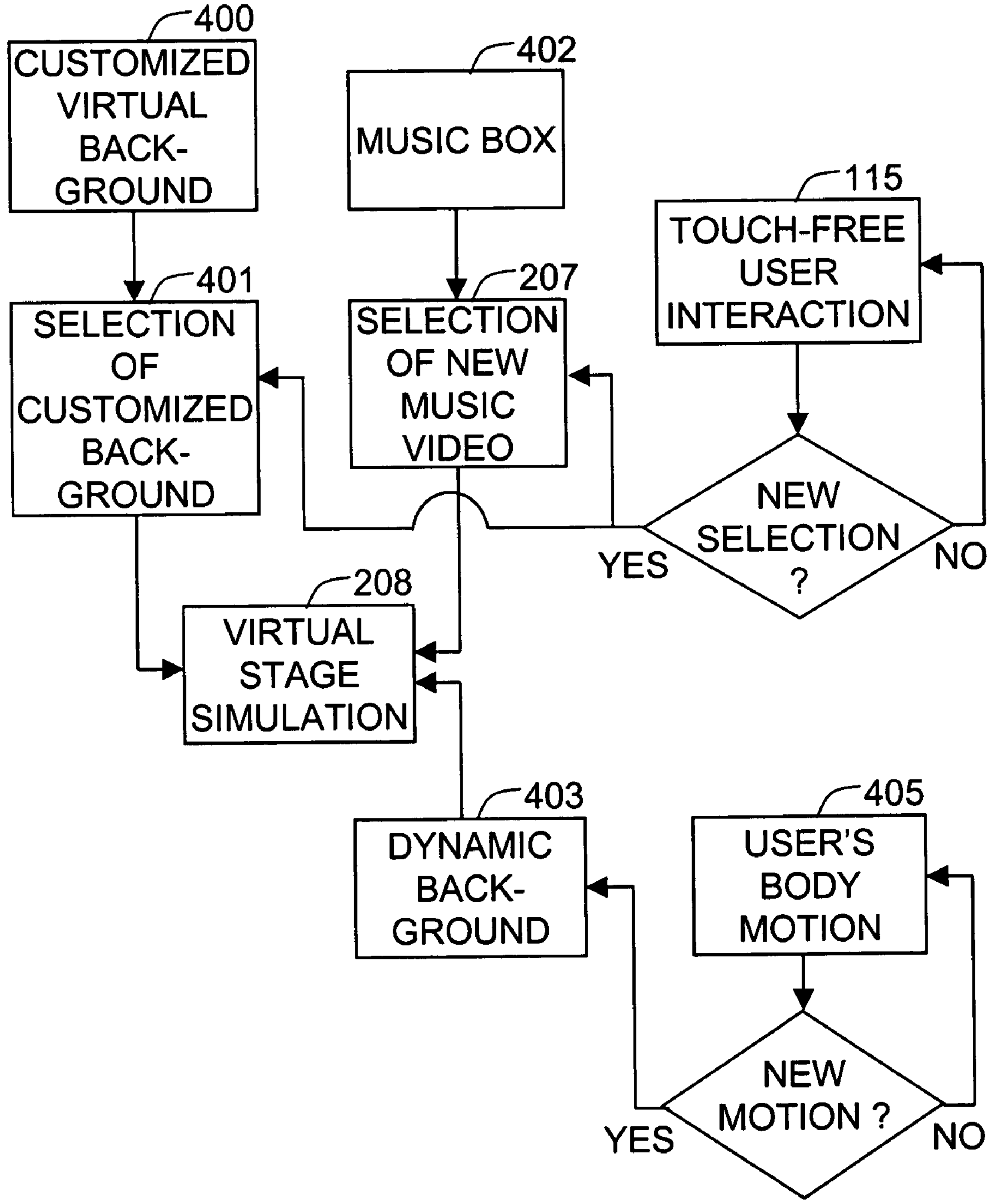

FIG. 4—Block Diagram for Virtual Stage Simulation Module

Figure 5:
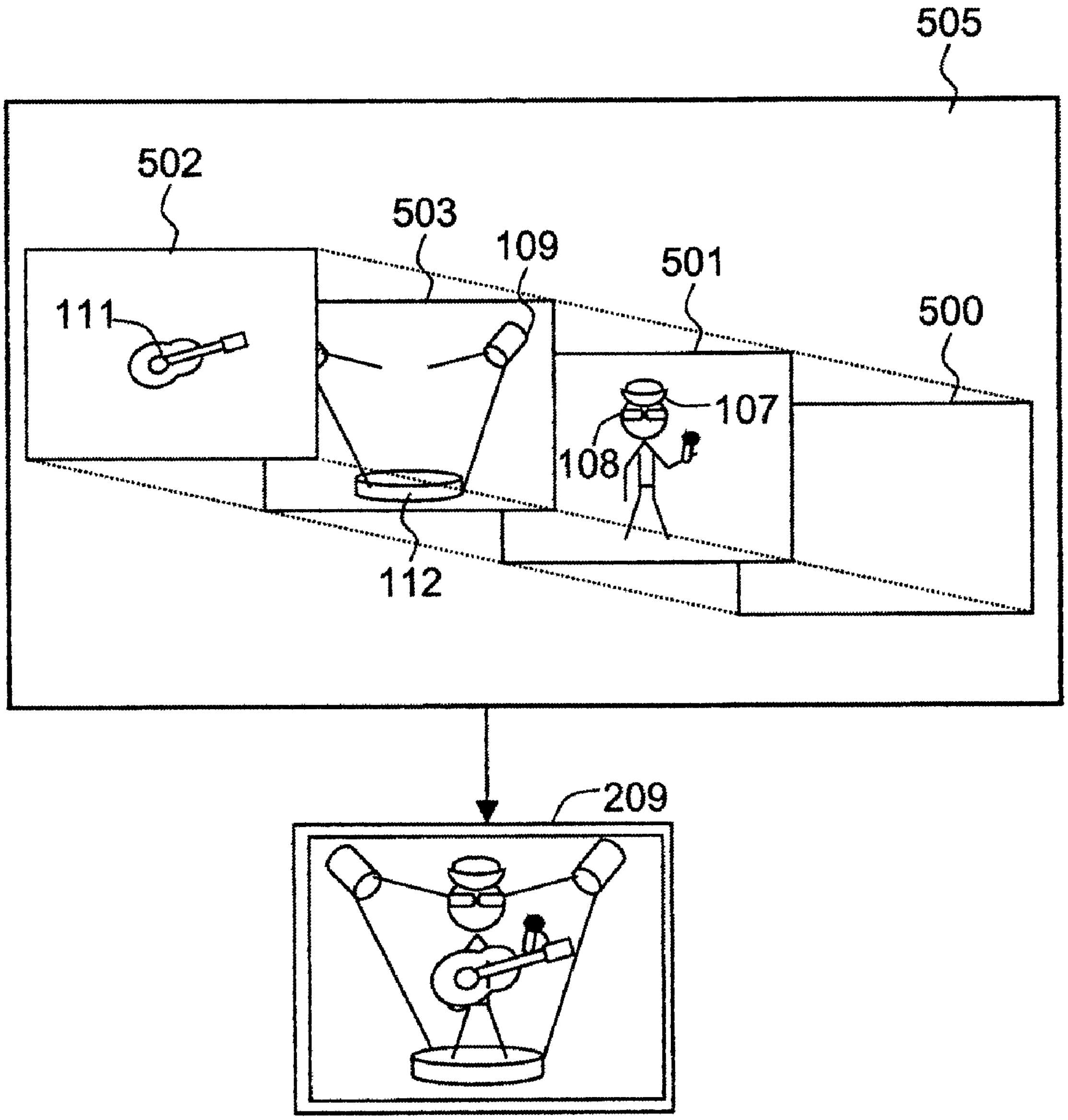

FIG. 5—Virtual Stage Simulation by Composing Multiple Augmented Images

Figure 6:
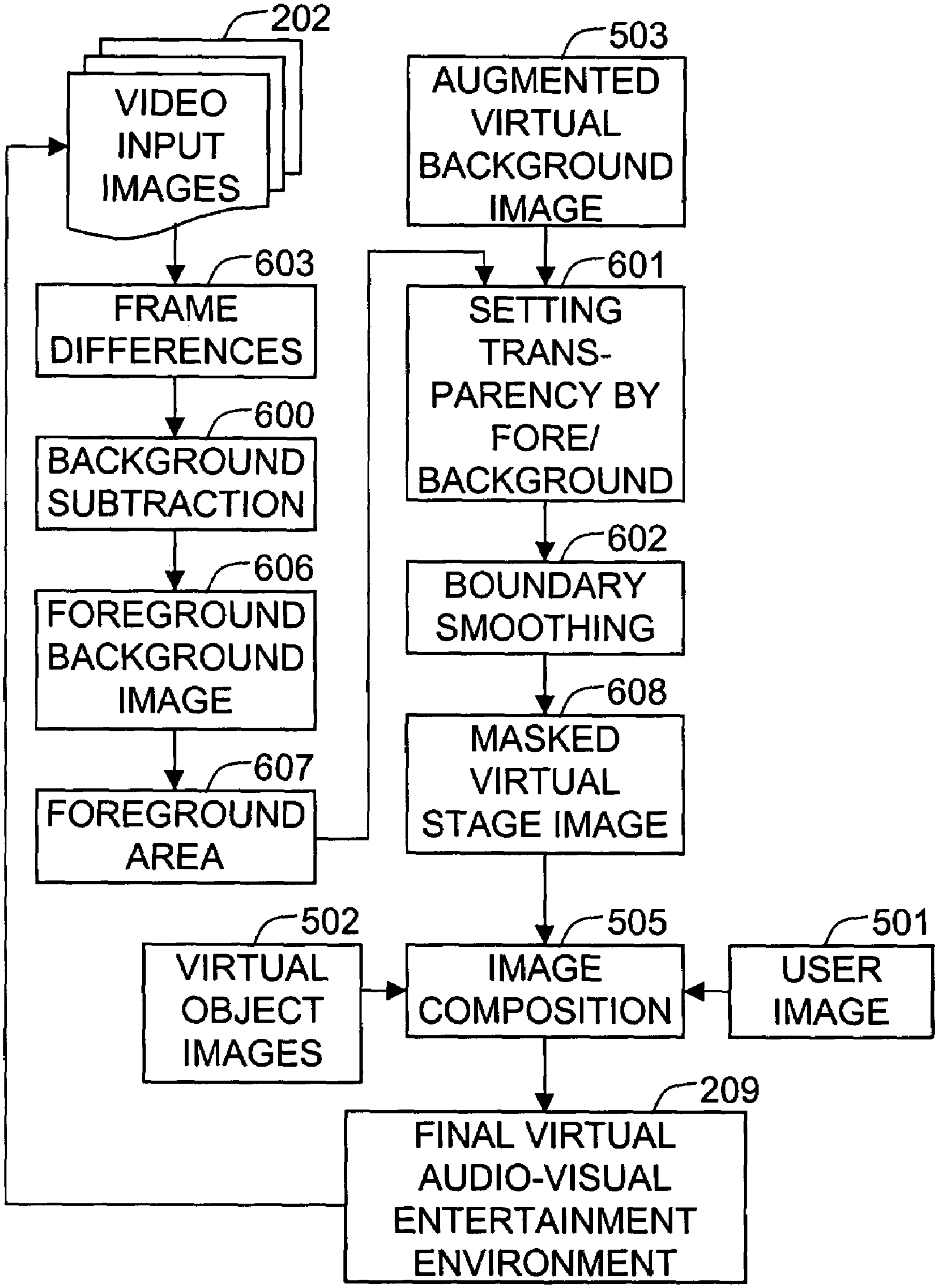

FIG. 6—Dynamic Background of Virtual Stage Simulation Modules

DETAILED DESCRIPTION OF THE INVENTION

FIG. 1 shows the overall system that provides the hardware and application context for the present invention. In the exemplary embodiment shown in FIG. 1, the hardware components of the system consist of an image capturing device 100, means for displaying output 101, means for processing and controlling 102, a sound system 103, a microphone 105, and an optional lighting system 106. The image of the user is superimposed with a hat image 107, sunglasses image 108, or any other predefined virtual object images. The background is also augmented to provide a virtual reality environment for the user. For this embodiment, a virtual platform image 112 and spotlight image 109 were added to the background. Musical instrument type virtual objects, such as a virtual piano image or a virtual guitar image 111, can also be added to the scene in order to simulate a stage environment. The user's body blends into the background, and the background dynamically changes according to the user's motion in real-time. The user can select different virtual objects by a motion-based, touch-free interaction 115 process. The image-capturing devices automatically adjust to the height of the viewing volume according to the height of the user. The user's face is being tracked in real-time and augmented by virtual object superimposition 204.

In this exemplary embodiment shown in FIG. 1, a camera, such as the Sony EVI-D30, and frame grabber, such as the Matrox Meteor II frame grabber, may be used as the image-capturing device 100 if dynamic control is needed. A firewire camera, such as the Pyro 1394 web cam by ADS technologies or iBOT FireWire Desktop Video Camera by OrangeMicro, or a USB camera, such as the QuickCam Pro 3000 by Logitech, may be used as the image capturing devices if dynamic control of the field of view is not needed. A large display screen, such as the Sony LCD projection data monitor model number KL-X9200U, may be used for the means for displaying output 101 in the exemplary embodiment. A computer system, such as the Dell Precision 420, with processors, such as the dual Pentium 864 Mhz microprocessors, and with memory, such as the Samsung 512 MB DRAM, may be used as the means for processing and controlling 102 in the exemplary embodiment. Any appropriate sound system and wired or wireless microphone can be used for the invention. In the exemplary embodiment, the Harman/Kardon multimedia speaker system may be used as the sounding system 103 and audio-technica model ATW-R03 as the microphone 105. Any appropriate lighting 106, in which the user's face image is recognizable by the image capturing device 100 and means for processing and controlling 102, can be used for the invention. The processing software may be written in a high level programming language, such as C++, and a compiler, such as Microsoft Visual C++, may be used for the compilation in the exemplary embodiment. Image creation and modification software, such as Adobe Photoshop, may be used for the virtual object and stage creation and preparation in the exemplary embodiment.

FIG. 2 shows the two main modules in the EVIKA system and block diagram and how the invention simulates the virtual audio-visual entertainment system environment.

The facial image enhancement module 200 uses the embedded FET system 203 in order to enhance the participant's facial image. The FET system 203 is a system for enhancing facial images in a continuous video stream by superimposing virtual objects onto the facial images automatically, dynamically and in real-time. The details of the FET system 203 can be found in the R. Sharma and N. Jung, Method and System for Real-time Facial Image Enhancement, U.S. Provisional Patent. Application No. 60/394,324, Jul. 8, 2002. The image-capturing device captures the video input images 202 and feeds them into the FET system 203. After the FET system 203 superimposes 204 the virtual object, which is selected 206 by the user in real-time, onto the facial image, such as the image for eyes, nose, and mouth, the facial image is enhanced. For example, the image of the user's eyes can be superimposed by a pair of sunglasses image 108, as described in the FET system. Thus, the facial image enhancement by the facial image enhancement module 200 can be accomplished at the level of facial features in the exemplary embodiment. The enhanced facial image 205 provides an interesting and entertaining spectacle to the user and surrounding people.

The virtual stage simulation module 201 is concerned with constructing the virtual stage 208. A touch-free user interaction 115 tool enables the user to select the music 207 and the virtual background 401. In the exemplary embodiment shown in FIG. 2, the method and system as described in a provisional patent application by R. Sharma, N. Krahnstoever, and E. Schapira, Method and System for Detecting Conscious Hand Movement Patterns and Computer-generated Visual Feedback for Facilitating Human-computer Interaction, U.S. Provisional Patent filed. Apr. 2, 2002, may be used for the touch-free user interaction. Depending on the user selection, the virtual stage is simulated 208 to provide an interesting and exciting environment. Through this virtual environment, the user is able to experience what was not possible in the normal life before.

After the facial image enhancement module 200 and the virtual stage simulation module 201 finish the process, the images are combined and create the final virtual audio-visual entertainment environment 209.

FIG. 3 shows the details of the facial image enhancement module. The image-capturing device captures the input video images in the beginning of this module. The primary input is the video input images 202 in the EVIKA system.

Below is the list of the performance requirements for the FET system 203 for the continuous real-time input video images.

a. The face detection, facial feature detection, face tracking, hand tracking, and superimposition of the objects must run together in such a way that real-time processing is possible.
b. The system has to be adaptive to the variation in continuous images from frame to frame, where the image conditions from frame to frame could be different.
c. The user has to be able to use the system naturally without any cumbersome initializing of the system manually. In another words, the system has to automatically initialize itself.
d. The usage of threshold and fixed size templates has to be avoided.
e. The system has to work with not only high-resolution images but also low-resolution images and adapt to changes in resolution.
f. The system has to be tolerant to noise and lighting variation.
g. The system has to be user independent and work with different people of varying facial features, such as different skin colors, shapes, and sizes.

The video input images 202 are passed on and processed by the FET system 203, which efficiently handles the requirements mentioned above. The FET system 203 detects and tracks the face and facial feature images, and finally the FET system 203 superimposes 204 the face images with the selected and preprocessed virtual objects 300. The virtual objects are selected by the user in real-time through the touch-free user interaction 115 interface.

FIG. 4 shows the details of the virtual stage simulation module. Customized virtual background images 400 are created and prepared offline. The music is also stored in the music box 402. They are loaded at the beginning of the execution and can be selected using the touch-free user interaction 115 process. When a new background and a new song are selected 207, 401, they are combined to simulate the virtual stage 208. During or after the selection process, if the user moves 405, the background also changes dynamically 403. This dynamically changing background also contributes to the simulation of the virtual stage 208.

FIG. 5 shows the virtual stage simulation by composing 505 multiple augmented images. In the exemplary embodiment shown in FIG. 5, the final virtual audio-visual entertainment environment 209 may be composed of multiple images, such as the original background image 500, the image for virtual objects 502 such as musical instruments, the user's image 501 with enhanced facial images 205, and the augmented virtual background image 503. The touch-free interaction 115 process allows the user to select the appropriate virtual objects, such as a hat image 107 or sunglasses image 108, to superimpose onto the user's facial image. It also allows the user to select music and the augmented virtual background image 503, which is augmented by environmental objects, such as virtual platform images 112 and spotlight images 109 in the exemplary embodiment. The images for virtual objects 502 like musical instruments, such as a virtual guitar image 111, may also be added to the final virtual background image in the exemplary embodiment.

FIG. 6 shows the dynamic background construction method in the virtual stage simulation module. When the user moves, the images change from one frame to the next. Using the differences 603 between frames, when the image-capturing device is fixed, the foreground and background image 606 can come out by the background subtraction process 600. In the exemplary embodiment shown in FIG. 6, any standard background subtraction algorithm can be used. With the image-capturing device fixed, the background can be calculated by any standard model, such as the mean of the pixels from the sequence of images. The foreground 607 from this model could be defined as follows, in the exemplary embodiment shown in FIG. 6;

$$F_t(x,y)=|I_t(x,y)-B_t(x,y)|>T$$

where $F_t(x, y)$ is the foreground determination function at time t, $I_t(x, y)$ is the target pixel at time t, $B_t(x, y)$ is the background model, and T is the threshold. The background model $B_t(x, y)$ could be represented by the mean and covariance by the Gaussian of the distribution of pixels, or the mixture of Gaussian, or any other standard background model generation method. In a paper by C. Stauffer and W. E. L Grimson, Adaptive Background Mixture Models for Real-Time Tracking, In Computer Vision and Pattern Recognition, volume 2, pages 246–253, June 1999, the authors describe a method for modeling background in more detail. The area where the user moved becomes the foreground 607 in the image.

When this foreground and background image 606 is applied to the initial virtual stage image, the augmented virtual background image 503, the foreground 607 region in the virtual stage image can be set to be transparent 601. After the foreground 607 region is set to be transparent the boundary between the foreground and background is smoothed 602. This smoothing process 602 allows the user to be fully immersed into the masked virtual stage image 608. This masked virtual stage image 608 is overlapped with the user's image 501 and additional virtual object images 502. Here the masked virtual stage image 608 is positioned in front of the user's image 501, and the user's body image is shown through the transparency channel region of the masked virtual stage image 608.

When the user does not move, the virtual stage image could hide the user's body image since the foreground and background image 606 from the background subtraction might not produce clear foreground and background images 606. This is an interesting feature for the invention because it can be used as a method to ask the user to participate in the movement or dance as long as the user wants to see themselves. This interesting feature could be also disabled so that the user's body is always shown through the masked virtual stage image 608. It is because the previous result of the background subtraction is still correct and can be used when there is no user's motion unless the user is totally out of the interaction. When the user is totally out of the interaction, the face detection process, in the facial image enhancement module 200, recognizes this and terminates the execution of the system. This dynamic background construction process is repeated as long as the user moves in front of the image-capturing device. The masked virtual stage image 608 changes dynamically according to the user's arbitrary motion in real-time within this loop. The virtual objects, such as the virtual guitar image 111, also moves along with the user's motion in real-time. This whole process makes the final virtual audio-visual entertainment environment 209 on the screen enhance the stage environment and enables the user to experience a new and active experience.

We claim:

1. A method for augmenting visual images of audio-visual entertainment systems, comprising the following steps of:

(a) enhancing facial images of a user or a plurality of users in a video input by superimposing virtual object images to said facial images, (b) simulating a virtual stage environment image, further comprising steps of processing virtual object image selection, processing music selection, and composing virtual stage images, (c) setting up masked regions on the simulated virtual stage environment image, and (d) positioning the masked virtual stage environment image in front of the body image of said user or said plurality of users, whereby the step for enhancing facial images is processed at the level of local facial features on face images of said user or said plurality of users, whereby examples of the facial features can be eye, nose, and mouth of said user or said plurality of users, and whereby the body image of said user or said plurality of users is shown through the transparency channel region of the masked virtual stage environment image.

2. The method according to claim 1, wherein the method further comprises a step for using movement of said user or said plurality of users to trigger dynamically changing virtual background images, whereby without the movement, said body image of said user or said plurality of users could disappear behind the virtual background images, whereby this feature adds an interesting and amusing value to the system, in which said user or said plurality of users has to dance as long as said user or said plurality of users wants to see herself/himself on a means for displaying output, and whereby this feature can be utilized as a method for said user or said plurality of users to participate in a dance in front of the audio-visual entertainment system.

3. The method according to claim 1, wherein the method further comprises a step for attaching musical instrument images, such as a guitar image or a violin image, to said body image of said user or said plurality of users, whereby the attached musical instrument images dynamically move along with arbitrary motion of said user or said plurality of users in real-time, and whereby said user or said plurality of users can also play the musical instrument by pretending as if he or she actually plays the musical instrument while looking at the musical instrument image on a means for displaying output.

4. An apparatus for augmenting visual images of an audio-visual entertainment system comprising:

(a) one or a plurality of means for capturing facial images from video input image sequences of a user or a plurality of users, (b) means for displaying output, (c) means for enhancing said facial images of said user or said plurality of users from said video input image sequences by superimposing virtual object images to said facial images, (d) means for processing dynamically changing virtual background images according to body movements of said user or said plurality of users, (e) means for simulating a virtual stage environment image by composing the enhanced facial and body image of said user or said plurality of users, virtual stage images, and virtual objects images, and (f) means for handling interaction between said user or said plurality of users and said audio-visual entertainment system, (g) a sound system, and (h) a microphone, whereby the means for enhancing facial images processes the facial image enhancement at the level of local facial features on said facial images of said user or said plurality of users, and whereby examples of the facial features can be eyes, nose, and mouth of said user or said plurality of users.

5. The apparatus according to claim 4, wherein the (c) means for enhancing said facial images of said user or said plurality of users from said video input image sequences further comprises means for using a facial image enhancement process.

6. The apparatus according to claim 4, wherein the (c) means for enhancing said facial images of said user or said plurality of users from said video input image sequences further comprises means for using the embedded FET system for a facial image enhancement process.

7. The apparatus according to claim 4, wherein the (e) means for simulating a virtual stage environment image by composing the enhanced facial and body image of said user or said plurality of users, virtual stage images, and virtual objects images further comprises means for preparing said virtual object images, such as musical instrument images and stage images, off-line.

8. The method according to claim 1, wherein the method further comprises a step for processing the facial image enhancement automatically, dynamically, and in real-time.

9. The method according to claim 1, wherein the step (b) simulating a virtual stage environment image further comprises a touch free interface for processing virtual object image selection and processing music selection.

10. The method according to claim 9, wherein the method further comprises a step for processing (a) said virtual object image selection and said music selection by said touch free interface, (b) the enhancement of said facial images at the local facial feature level, and (c) the composition of the virtual stage images on any arbitrary background in the actual environment rather than a controlled background, such as a blue-screen style background, whereby the dynamic background construction can be processed by an adaptive background subtraction algorithm.

11. The method according to claim 1, wherein the method further comprises a step for combining the enhanced facial images of said user or said plurality of users and said body image of said user or said plurality of users with dynamically changing virtual background images, whereby the virtual background images dynamically change according to arbitrary movement of said user or said plurality of users in real-time.

12. The apparatus according to claim 4, wherein the apparatus further comprises means for enhancing the facial images automatically, dynamically, and in real-time.

13. The apparatus according to claim 4, wherein the means for simulating a virtual stage environment image further comprises means for:

(a) processing virtual object image selection, (b) processing music selection, and (c) composing virtual stage images, wherein the selection is processed by a touch free interface.

14. The apparatus according to claim 4, wherein the apparatus further comprises means for processing any arbitrary background in the actual environment rather than a controlled background, such as a blue-screen style background, for constructing said dynamically changing virtual background images, for processing of said facial images from said user or said plurality of users in order to obtain facial features and body movement information of said user or said plurality of users, and for processing user interaction by a touch-free interface, whereby said dynamically changing virtual background images are background images which change according to arbitrary movement of said user or said plurality of users in real-time.

15. The apparatus according to claim 4, wherein the apparatus further comprises a means for combining the enhanced facial images of said user or said plurality of users and the body images of said user or said plurality of users with said dynamically changing virtual background images, whereby the virtual background images dynamically change according to arbitrary movement of said user or said plurality of users in real-time, and whereby the enhanced facial images are accomplished at the local facial feature level, such as eyes, nose, and mouth.

16. A method for augmenting images on a means for displaying output of an audio-visual entertainment system, comprising the following steps of:

(a) capturing a plurality of images for a user or a plurality of users with a single or a plurality of means for capturing images, (b) processing a single image or a plurality of images from the captured plurality of images in order to obtain facial features and body movement information of said user or said plurality of users, (c) processing selection by said user or said plurality of users for virtual object images on a means for displaying output, (d) augmenting facial feature images of said user or said plurality of users with the selected virtual object images, (e) simulating a virtual stage environment image, and (f) displaying the augmented facial images with said facial feature images of said user or said plurality of users and the simulated virtual stage environment image on said means for displaying output, whereby the step for augmenting facial feature images is processed at the level of local facial features on face images of said user or said plurality of users, whereby examples of the local facial features can be eyes, nose, and mouth of said user or said plurality of users, and whereby the step for augmenting facial feature images of said user or said plurality of users with the selected virtual object images is processed automatically, dynamically, and in real-time.

17. The method according to claim 16, wherein the method further comprises a step for processing touch-free interaction for the selection of said virtual object images.

18. The method according to claim 16, wherein the method further comprises a step for processing music selection by a touch-free interface.

19. The method according to claim 16, wherein the method further comprises a step for processing any arbitrary background in the actual environment rather than a controlled background, such as a blue-screen style background, for constructing dynamically changing virtual background images, for processing of said single image or said plurality of images from said captured plurality of images in order to obtain facial features and body movement information of said user or said plurality of users, and for processing of selection by said user or said plurality of users for said virtual object images on said means for displaying output, whereby said dynamically changing virtual background images are background images which change according to arbitrary movement of said user or said plurality of users in real-time, and whereby the system can reside in any arbitrary environment.

20. The method according to claim 19, wherein the method further comprises a step for combining the augmented facial images of said user or said plurality of users and body images of said user or said plurality of users with said dynamically changing virtual background images, whereby the virtual background images dynamically change according to arbitrary movement of said user or said plurality of users in real-time, and whereby the augmented facial images are accomplished at the local facial feature level, such as eyes, nose, and mouth.

21. The method according to claim 20, wherein the method further comprises a step for positioning a masked virtual stage image in front of said body images of said user or said plurality of users, whereby said body images of said user or said plurality of users are shown through the transparency channel region of said masked virtual stage image.

22. The method according to claim 20, wherein the method further comprises a step for using movement of said user or said plurality of users to trigger the dynamically changing background images, whereby without said movement of said user or said plurality of users, said body images of said user or said plurality of users could disappear behind the background image, whereby this feature adds an interesting and amusing value to the system, in which said user or said plurality of users have to dance as long as said user or said plurality of users want to see themselves on said means for displaying output, and whereby this feature can be utilized as a method for said user or said plurality of users to participate in a dance in front of the audio-visual entertainment system.

23. The method according to claim 16, wherein the method further comprises a step for attaching musical instrument images, such as a guitar image or a violin image, to body images of said user or said plurality of users, whereby the attached musical instrument images dynamically move along with the arbitrary motion of said user or said plurality of users in real-time, and whereby said user or said plurality of users can also play the musical instrument by pretending as if he or she actually plays the musical instrument while looking at the musical instrument image on said means for displaying output.

* * * * *